3,284,296
TRIALKYL TIN COMPOUNDS AS MOLLUSCICIDES
Ashley H. Freiberg, Santa Clara, Calif., assignor to Stauffer Chemical Company, New York, N.Y., a corporation of Delaware
No Drawing. Filed Feb. 21, 1966, Ser. No. 528,814
7 Claims. (Cl. 167—46)

This application is a continuation-in-part of application Serial No. 417,228, filed December 9, 1964, now abandoned.

This invention relates to a method of controlling mollusks. More specifically, this invention pertains to the use of certain organotin-containing compounds to control gastropods and related animals, especially snails.

Generally, the compounds useful according to this invention are trialkyl tin compounds which may be represented by the formula (lower alkyl)$_3$—Sn—XR wherein the lower alkyl groups contain from 1 to 6 carbon atoms, inclusive, X is selected from the group consisting of oxygen and sulfur, and R is selected from the group consisting of phenyl, naphthyl, quinolyl and substituted phenyl, naphthyl and quinolyl groups, wherein said substituents are halogen, lower alkyl containing from 1 to 6 carbon atoms, and nitro groups. Examples of lower alkyl radicals contemplated as substituents for the phenyl, naphthyl and quinolyl groups are methyl, ethyl, n-propyl, isopropyl, n-butyl, sec.-butyl, isobutyl, n-pentyl, 2-methyl butyl, n-hexyl, 2-methyl-pentyl, 2,2-dimethyl propyl, and the like.

The term snail is used herein to include both snails and slugs, terrestrial as well as aquatic. Snails may be members of a large class of gastropod mollusks including most forms having a univalve shell or having no shell.

Snails cause serious economic and health problems in many parts of the world. Economically snails can be quite injurious to vegetation as they attack and destroy a wide variety of beneficial agricultural plants. Even more injurious is the fact that many snails are involved in the life cycle of many tropical and semi-tropical diseases. Millions of people and countless animals in many parts of the world are afflicted with these diseases. Snails play a significant role in the growth cycle of the parasite involved. It is in snails that larval stages develop and emerge to enter warm-blooded animals and mature into worms. The worms lay eggs which are carried to vital organs in the body by the blood stream. The eggs find their way back into snails, through water supplies and the like, and the cycle begins once more. Theoretically a single snail can be the ancestor of three million new snails a year.

Needless to say, there is a genuine demand for combating snails with effective chemical agents. Snail control is one of the most rapid and effective means for reducing transmission of many tropical and semi-tropical diseases.

In accordance with the invention it has been found that the class of organotin compounds shown in the above formula exhibit remarkable activity against snails and related mollusks. Therefore, the provision of a method for controlling said mollusks by means of said organotin compounds constitutes the principal object of this invention. Yet further objects will become apparent throughout the balance of the invention.

Several of the trialkyl tin organic compounds, the molluscicidal utility of which is herein contemplated, are known in the chemical arts. As an example, the trialkyl tin arenolates and thioarenolates are generally prepared by cleaving a bis(trialkyl tin) oxide with the requisite acidic material, either an arenol or thioarenol. Typically, one mole of the bis(trialkyl tin) oxide and two equivalents of the acidic material are heated together in the presence of a relatively inert liquid organic solvent or if desired in the absence of a solvent using the reactants to make up the solution. There is obtained two moles of the trialkyl tin arenolate or thioarenolate which can be isolated in the usual manner.

In practicing the present invention any of the various techniques or methods can be employed for exposing the mollusks to the toxic organotin compound. For example, bait formulations can be prepared such that the snails will seek out the treated bait. In application to a body of water for control of aquatic species, effective rates may be added directly thereto. The details of compounding and application are well-known to those skilled in the art.

The compounds of the present invention were tested as molluscicides according to the following method.

*Molluscicidal evaluation test.*—In order to establish molluscicidal action, stock solutions of the candidate compounds were diluted in tap water, pH 7.5–7.8. A portion, 100 mls., of each dilution was placed in a 6-ounce cold drink Dixie cup and allowed to reach room temperature. Four common water snails from the two species, *Helisoma tenue* Philippi, and *Helisoma subcrenatum* Carpenter, of approximately the same size were placed in each test cup. These species were used as representatives of snails and slugs. The snails were retained in the test solution for 24 hours. At the end of that time the test solution was discarded and the snails were rinsed a number of times in tap water. The snails were then transferred to new Dixie cups containing only tap water. Mortality was recorded 24 hours later. The snails were considered dead if no movement was observed for a period of 8 hours and if no movement was observed in response to prodding with a dissecting needle. The values giving 100 percent kill of the snails are reported in the following table in parts-per-million.

TABLE—MOLLUSCICIDAL ACTIVITY

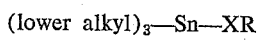

| Compound number | Lower alkyl | X—R | P.p.m. 100% kill |
|---|---|---|---|
| 1 | n-Butyl | Pentachlorothiophenolate | 0.06 |
| 2 | i-Butyl | 2,4,5-trichlorophenolate | 0.06 |
| 3 | do | 4-chlorothiophenolate | 0.12 |
| 4 | n-Butyl | 3-methyl-4-chlorophenolate | 0.06 |
| 5 | do | 2,6-diisopropylphenolate | 0.25 |
| 6 | do | 8-quinolinolate | 0.06 |
| 7 | do | 2-chloro-4-nitrophenolate | 0.06 |
| 8 | do | Pentachlorophenolate | 0.06 |
| 9 | do | Pentabromophenolate | 0.06 |
| 10 | do | 2-nitro-4-methylphenolate | 0.06 |
| 11 | do | 4-nitrophenolate | 0.06 |
| 12 | do | 2-nitro-4-chlorophenolate | 0.12 |
| 13 | i-Butyl | Pentachlorothiophenolate | 0.06 |
| 14 | n-butyl | Thionaphtholate | 0.12 |
| 15 | do | 5,7-dichloro-8-quinolinolate | 0.06 |

From the table it can be seen that the organotin molluscicides of the present invention control the vector species effectively at very low concentrations. The compounds may be applied in a variety of ways at various concentrations. The amount applied will depend upon the nature of the environment and utility. The rate of application may also vary with the mollusk species whose control is desired.

Various changes and modifications may be made without departing from the spirit and scope of the invention described herein as will be apparent to those skilled in the art to which it pertains. It is accordingly intended that the present invention shall only be limited by the appended claims.

I claim:
1. A method of combating snails which comprises contacting said snails with an effective amount of a compound of the formula

(lower alkyl)$_3$—Sn—XR wherein the lower alkyl groups contain from 1 to 6 carbon atoms, inclusive, X is selected from the group consisting of oxygen and sulfur, and R is selected from the group consisting of phenyl, naphthyl, quinolyl and substituted phenyl, napthyl and quinolyl groups, wherein said substituents are selected from the group consisting of halogen, lower alkyl containing from 1 to 6 carbon atoms, nitro, and combinations thereof.

2. The method of combating snails according to claim 1 wherein said compound is tri-n-butyltin pentachlorothiophenolate.

3. The method of combating snails according to claim 1 wherein said compound is tri-i-butyltin 2,4,5-trichlorophenolate.

4. The method of combating snails according to claim 1 wherein said compound is tri-n-butyltin 8-quinolinolate.

5. The method of combating snails according to claim 1 wherein said compound is tri-n-butyltin 2-chloro-4-nitrophenolate.

6. The method of combating snails according to claim 1 wherein said compound is tri-i-butyltin 4-chlorothiophenolate.

7. The method of combating snails according to claim 1 wherein said compound is tri-n-butyltin thionaphtholate.

No references cited.

JULIAN S. LEVITT, *Primary Examiner.*

JEROME D. GOLDBERG, *Assistant Examiner.*